United States Patent [19]

Murr

[11] Patent Number: 5,408,616
[45] Date of Patent: Apr. 18, 1995

[54] SYSTEM FOR REDIRECTING OUTPUT TO EITHER RETURN BUS OR NEXT MODULE LINE UPON THE DETECTION OF THE PRESENCE OR ABSENCE OF NEXT MODULE USING GROUND LINE

[75] Inventor: Robert L. Murr, Cedar Rapids, Iowa

[73] Assignee: Rockwell International Corp., Seal Beach, Calif.

[21] Appl. No.: 846,182

[22] Filed: Mar. 4, 1992

[51] Int. Cl.6 .................. G06F 13/00; G06F 15/48
[52] U.S. Cl. .................... 395/325; 395/800; 395/275; 364/232.7; 364/229.4; 364/229.3; 364/240; 364/DIG. 1; 370/85.1; 340/825.05
[58] Field of Search ............ 395/800, 325, 275, 200; 340/825.05, 870.11, 825.05; 370/85.9, 16, 16.1, 85.1

[56] References Cited

U.S. PATENT DOCUMENTS

| | | | |
|---|---|---|---|
| 4,114,138 | 9/1978 | Demers | 340/825.65 |
| 4,155,075 | 5/1979 | Weckenmann et al. | 340/825.65 |
| 4,360,870 | 11/1982 | McVey | 395/275 |
| 4,500,951 | 2/1985 | Sugimoto et al. | 364/186 |
| 4,562,535 | 12/1985 | Vincent et al. | 395/325 |
| 4,617,566 | 10/1986 | Diamond | 340/870.11 |
| 4,630,233 | 12/1986 | Weppler | 395/275 |
| 4,660,169 | 4/1987 | Norgren et al. | 395/325 |
| 4,683,550 | 7/1987 | Jindrick et al. | 364/709.1 |
| 4,683,563 | 7/1987 | Rouse et al. | 370/16 |
| 4,692,859 | 9/1987 | Ott | 340/825.65 |
| 4,745,597 | 5/1988 | Morgan et al. | 370/87 |
| 4,955,020 | 9/1990 | Stone et al. | 370/85.9 |
| 5,115,235 | 5/1992 | Oliver | 340/825.52 |
| 5,177,737 | 1/1993 | Dandelin et al. | 370/67 |
| 5,179,548 | 1/1993 | Sandesara | 370/16.1 |
| 5,179,670 | 1/1993 | Farmwald et al. | 395/325 |
| 5,182,798 | 1/1993 | Francisco | 395/200 |
| 5,235,594 | 8/1993 | Lee | 370/85.9 |

Primary Examiner—Alyssa H. Bowler
Assistant Examiner—Meng-Ai T. An
Attorney, Agent, or Firm—Gregory G. Williams; M. Lee Murrah; H. Frederick Hamann

[57] ABSTRACT

An electronic library system cabinet having a ring bus architecture with a high reliability backplane wherein the electronic library system includes a plurality of slots for receiving a plurality of modules therein. The modules capability of determining whether the adjacent slot is occupied by a module and alternately directing output information from the module onto a return bus if the adjacent slot is unoccupied or onto an intermodule connection line if the adjacent slot is occupied by a module.

1 Claim, 1 Drawing Sheet

SYSTEM FOR REDIRECTING OUTPUT TO EITHER RETURN BUS OR NEXT MODULE LINE UPON THE DETECTION OF THE PRESENCE OR ABSENCE OF NEXT MODULE USING GROUND LINE

CROSS-REFERENCE TO RELATED APPLICATION

This application relates to the subject matter of a co-pending application by Mark R. Meyer et al, entitled "Flexible Avionics Computer System", filed on even date herewith and assigned to the same assignee, the Serial Number of which is Ser. No. 07/846,209; the subject matter of this application is incorporated herein by this reference.

FIELD OF THE INVENTION

The present invention generally relates to electronic library systems (ELS) for commercial airliners, and more particularly relates to an ELS having a ring-bus architecture and even more particularly relates to an ELS having line replaceable modules therein with sensing abilities for determining the presence or absence of line replaceable modules in adjacent slots and means for affecting the path of information output from the line replaceable module in response to the determination.

For years, pilots and members of the crew of airliners have been called upon to do numerous and various tasks that might be characterized as important, complicated and routine. Such tasks include calculating the fuel necessary to travel to an unscheduled landing spot, calculating the aircraft weight for determining compliance with airstrip restrictions, etc. Additionally, they are frequently looking through books to find and study the landing and taxiway configurations of many unfamiliar airfields. Recently, it has been proposed that the pilots and crew be provided with an ELS, which is a specially designed computer for the airliner crew. It has been proposed that this ELS contain the capability of providing a lower cost initial computer subsystem with the built in ability to add two more independent and identical computer subsystems. It has been proposed that this be accomplished by providing a single ELS cabinet with three sectors therein with each sector being dedicated to accommodating a single computer subsystem. Each sector would include an equal number of slots for receiving line replaceable modules or LRMs. The LRMs would be processor modules and memory modules.

It has also been proposed that the computer subsystems in the single cabinet be able to communicate with each other.

One approach has been to directly wire each slot or module to every other module or slot in the cabinet. This has the disadvantage of the cost of the additional wiring and the additional weight and space requirements.

Another approach that has been proposed is to use a ring architecture where the modules themselves are part of the ring. This has a disadvantage in that the omission of a module can break the ring and hinder communication.

Consequently, there exists a need for improvement in modular avionics systems.

SUMMARY

It is an object of the present invention to provide a modular avionic system with enhanced apparatus for communicating between LRMs.

It is a feature of the present invention to include a ring-bus architecture.

It is an advantage of the present invention to reduce wiring weight.

It is another object of the present invention to provide a convenient and reliable system for intermodule communication.

It is another feature of the present invention for each module to include the ability to sense the presence or absence of any adjacent module.

It is another advantage of the present invention to provide for intermodule communication without requiring inconvenient jumper blocks or reliability reducing active components on the backplane.

The present invention is designed to satisfy the aforementioned needs, accomplish the already articulated objects, include the above described features, and achieve the earlier expressed advantages. The present invention is carried out in a "direct wire-less" and "jumper block-less", and "active component-less" system, in the sense that the direct wiring typically associated with interconnecting each module, and the jumper blocks, and the active components on the back plane have been eliminated.

Instead, a ring-bus architecture is utilized where each LRMs has integral therewith a means for determining the presence or absence of an adjacent LRM and directing its output in alternate paths in response to such determination.

Accordingly, the present invention comprises a modular avionics system cabinet comprising a backplane having a ring-bus with at least two stations disposed therein for connection with line replaceable modules, a plurality of line replaceable modules each having the ability to sense the absence or presence of a line replaceable module in an adjacent slot in the cabinet and means for directing the output path of information from a line replaceable module in response to the determination of the absence or presence of an adjacent LRMs.

BRIEF DESCRIPTION OF THE DRAWINGS

The invention may be more fully understood by reading the following description of a preferred embodiment of the invention in conjunction with the appended drawings wherein.

DETAILED DESCRIPTION

Now referring to drawings wherein like numerals refer to like structure throughout.

Figure 1:
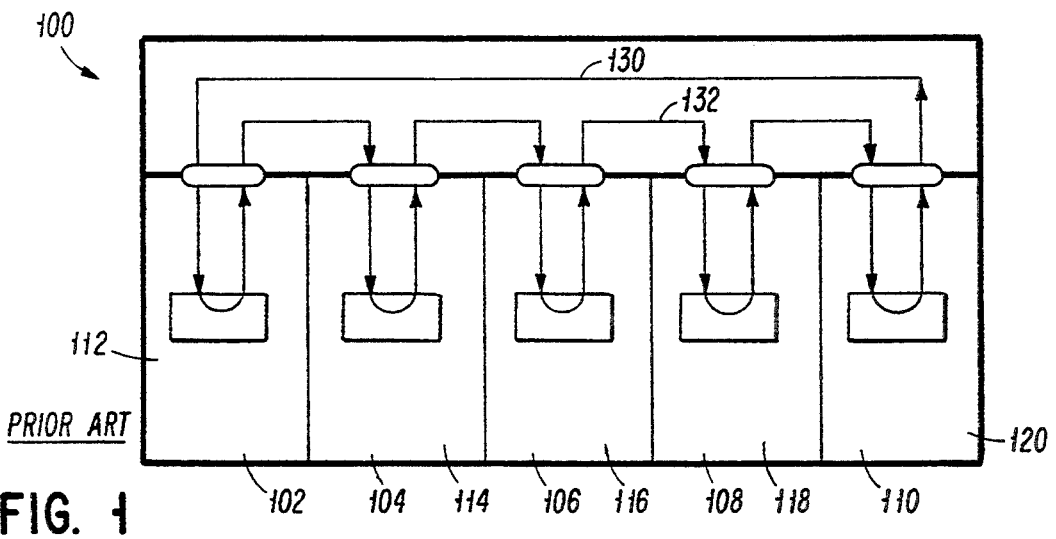
FIG. 1 is an avionics cabinet of the prior art showing direct wiring between each LRMS.

Now referring to FIG. 1, there is shown a modular avionics system, of the prior art, generally designated 100 having a first slot 102, a second slot 104, a third slot 106, a four slot 108, and a fifth slot 110 having modules 112, 114, 116, 118 and 120 respectively disposed therein. Also shown is back plane 130 having connecting wires 132 connecting each slot with the adjacent slot, so that a ring configuration is achieved when all slots are filled with modules.

Figure 2:
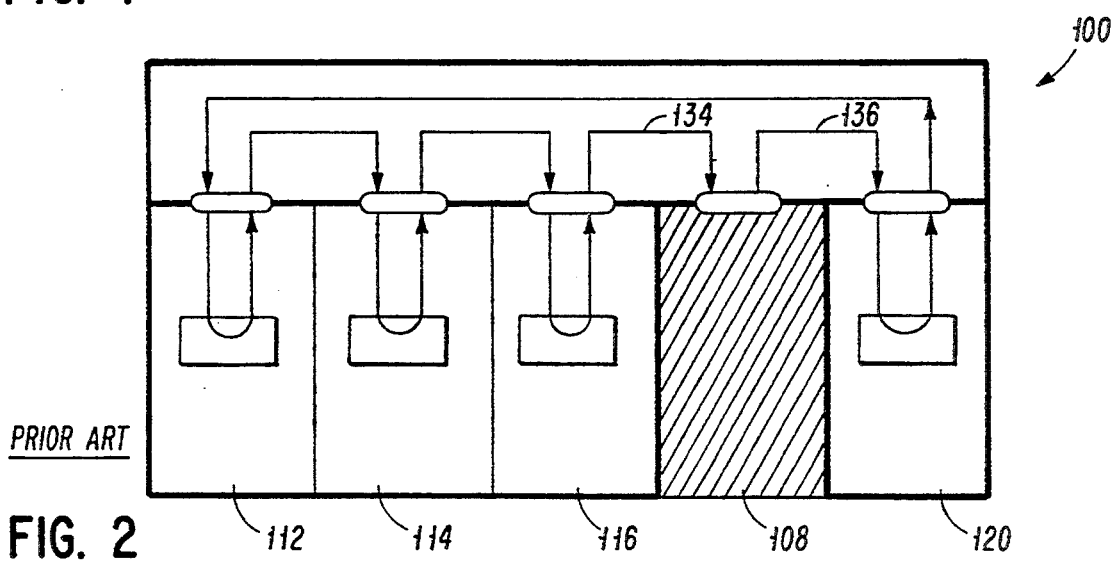
FIG. 2 is an avionics cabinet of FIG. 1 where the module for slot 4 is omitted.

Now referring to FIG. 2, there is shown the electronic library system 100, of FIG. 1 wherein slot 108 is not filled with a module. Consequently, the backplane connecting wire 134 from slot 106 to 108 is not connected through to backplane connecting wire 136 due to the absence of module 118. Consequently, modules 112, 114 and 116 would be unable to communicate with module 120.

Figure 3:
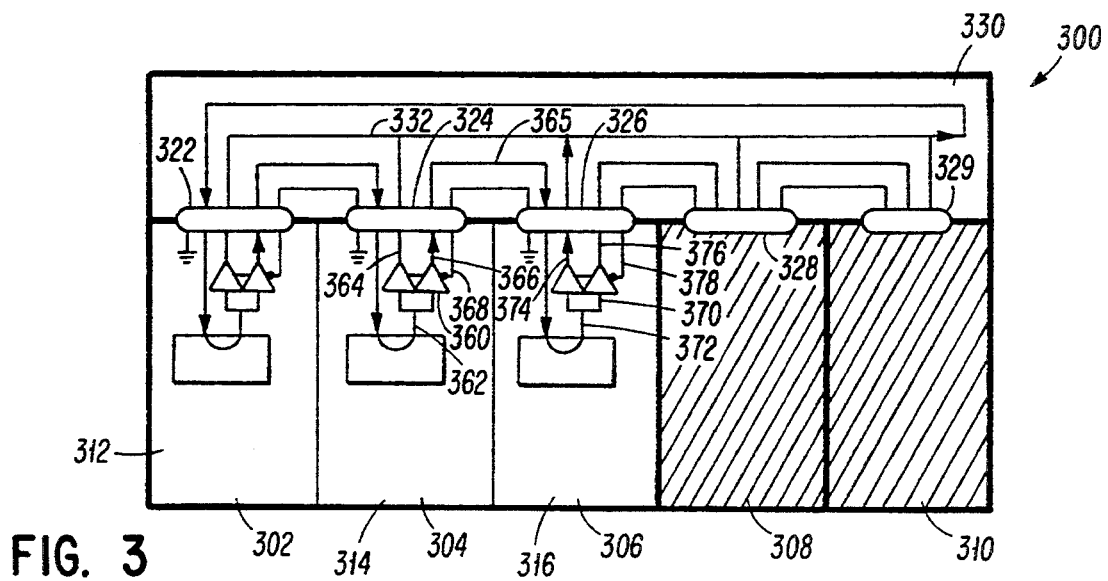
FIG. 3 is a representation of the present invention showing a plurality of LRMs coupled with a ring-bus architecture.

Now referring to FIG. 3, there is shown an electronic library system cabinet, of the present invention, generally designated 300 having a first slot 302, a second slot 304, a third slot 306, a fourth slot 308, and fifth slot 310. Slots 302, 304 and 306 are shown having modules 312, 314 and 316 respectively disposed therein. Also shown is back plane 330 having first connector 322, second connector 324, third connector 326, fourth connector 328, and fifth connector 329 disposed thereon. Back plane 330 also is shown having a return bus line 332.

In operation, the present invention provides intermodule communication as follows: if module 314 outputs information destined for module 312, buffers 360 receive information from module 314 on line 362. Buffers 360 determine whether to output that information on either line 364 or 366 by determining if line 368 indicates the presence of a module 316. If module 316 is present line 368 will be grounded and buffers will then pass the information from line 362 through line 366 to module 316. For the sake of illustration, if line 368 was not grounded (i.e. module 316 was missing) then buffers 360 would pass the information from line 362 onto line 364 and then to return bus 332. However, for this example, module 316 is present so buffers 360 will pass the information to module 316 wherein buffers 370 must determine, in a similar fashion to buffers 360, whether to send the information on line 372 (from line 366) out on line 374 or 376. Buffers 370 determine module 318 is missing because line 378 is not grounded. Consequently, the information is not sent out to slot 308 by line 376, but instead, is sent via line 374 to return bus 332. In summary, the information from module 314 is communicated to module 312 by sending it first through module 316 which senses the absence of module 318 and consequently sends the information to module 312 via return bus 332. Buffers 360 and 370 are well known in the art and may be chosen from several commercially available buffers or drivers depending on the peculiar requirements of any particular system.

The present invention provides for enhanced flexibility and enhanced reliability because slots may be left unoccupied and intermodule communication is still achieved in a ring configuration. Also the backplane if free from active switching components and the reliability problems associated therewith.

The above description is focused upon a modular avionics system configured as an electronic library system or (ELS) with LRMs therein. This is used for illustrative purpose only. It is certainly expected that modular avionics systems may be used for functions other than ELS, such as flight instruments, navigation aids, etc., and LRMs might be replaced with circuit cards or the like.

While particular embodiments of the present invention have been shown and described, it should be clear that changes and modifications may be made to such embodiments without departing from the true scope and spirit of the invention. It is intended that the appended claims cover all such changes and modifications.

I claim:

1. A modular avionics system, for use in an aircraft computer and communication system of a type having an aircraft data distribution network therein, the modular avionics system comprising:

a modular avionics system cabinet having first, second and third slots therein and further having a backplane therein interconnecting said first, second and third slots, said cabinet coupled with said aircraft data distribution network;

said backplane having a first line disposed between and connecting said first slot and said second slot, and a second line disposed between and connecting said second slot and said third slot and a uni-directional return bus therein;

a plurality of line replaceable modules, including a first line replaceable module disposed within said first slot and having disposed therein means for determining the presence or absence of another line replaceable module in said second slot, and means therein for directing an output from said first line replaceable module in response to a determination by said means for determining to either of said return bus or said first line; and, said means for determining the presence or absence of said another line replaceable module in each of said plurality of line replaceable modules comprises a plurality of buffers disposed within said each of said plurality of line replaceable modules, and a ground line extending from said first line replaceable module to said second slot, so that if said another line replaceable module is inserted into said second slot said ground line will be grounded.

* * * * *